(12) United States Patent
Donoghue

(10) Patent No.: US 7,619,615 B1
(45) Date of Patent: Nov. 17, 2009

(54) METHOD AND APPARATUS FOR SOFT KEYS OF AN ELECTRONIC DEVICE

(75) Inventor: Karen Donoghue, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 744 days.

(21) Appl. No.: 11/216,420

(22) Filed: Aug. 30, 2005

Related U.S. Application Data

(60) Provisional application No. 60/605,755, filed on Aug. 31, 2004.

(51) Int. Cl.
*G06F 3/02* (2006.01)
*G09G 5/00* (2006.01)

(52) U.S. Cl. ........................................ 345/169; 455/566

(58) Field of Classification Search ................. 345/156, 345/168, 169, 173–178; 455/566; 715/705–715
See application file for complete search history.

(56) References Cited

U.S. PATENT DOCUMENTS

| | | | | |
|---|---|---|---|---|
| 5,392,337 | A * | 2/1995 | Baals et al. | 379/457 |
| 6,028,600 | A * | 2/2000 | Rosin et al. | 715/718 |
| 6,209,006 | B1 * | 3/2001 | Medl et al. | 715/205 |
| 6,421,545 | B1 | 7/2002 | Christal | |
| 6,483,526 | B1 * | 11/2002 | Merrick | 715/780 |
| 6,567,133 | B2 | 5/2003 | Raijmakers et al. | |
| 6,757,372 | B1 * | 6/2004 | Dunlap et al. | 379/142.17 |
| 7,142,192 | B2 * | 11/2006 | De Waal | 345/157 |
| 7,321,789 | B2 * | 1/2008 | Ishihara et al. | 455/575.3 |
| 2001/0036844 | A1 * | 11/2001 | Ishigaki | 455/564 |
| 2001/0041596 | A1 * | 11/2001 | Forlenzo et al. | 455/566 |
| 2002/0028697 | A1 * | 3/2002 | Davies | 455/566 |
| 2002/0158915 | A1 | 10/2002 | Rowell, Jr. et al. | |
| 2003/0008686 | A1 | 1/2003 | Park et al. | |
| 2003/0071792 | A1 | 4/2003 | Safadi | |
| 2003/0174073 | A1 | 9/2003 | Koppich | |
| 2003/0231163 | A1 | 12/2003 | Hanon et al. | |
| 2003/0231208 | A1 | 12/2003 | Hanon et al. | |

FOREIGN PATENT DOCUMENTS

KR  2002095527 A  6/2001

OTHER PUBLICATIONS

Molta, D., "Choose the Right Intelligent Switching Strategy," *Network Computing*, http://www.networkcomputing.com/814/814sp2.html., downloaded Feb. 10, 2004 (3 pp.).

* cited by examiner

*Primary Examiner*—Amr Awad
*Assistant Examiner*—Stephen G Sherman
(74) *Attorney, Agent, or Firm*—Osha • Liang LLP

(57) ABSTRACT

An electronic device includes a keypad portion having at least one multifunction key and a display area displaying screen views having one or more soft key labels corresponding to respective ones of the multifunction keys. A display enhancing assembly enhances display of the soft key labels and/or menus in a manner that actively induces and trains the user to properly operate the multifunction keys in association with corresponding soft key labels. The display enhancing assembly employs visual cues such as a videographic moving arrow, help text bubbles, a sliding in/out presentation of menus in a series of menus and automated relative enlarging of pertinent text and/or dimming of non-pertinent screen contents.

2 Claims, 7 Drawing Sheets

METHOD AND APPARATUS FOR SOFT KEYS OF AN ELECTRONIC DEVICE

RELATED APPLICATIONS

This application claims the benefit of U.S. Provisional Application No. 60/605,755, filed Aug. 31, 2004, the entire teachings of which are incorporated herein by reference.

BACKGROUND OF THE INVENTION

With current computer and digital processing technology, there are various user interactive electronic devices with a display screen. These devices include but are not limited to personal organizers (PDA's), mobile telephones, electronic toys, electronic instruments, navigational systems and the like. In the case of hand-held portable devices, these devices are limited in overall dimensions which in turn, typically, greatly limits the display screen area.

Contents of screen views may include any combination of text, graphics and images (or video). Given the limitations of physical screen area, various content display schemes (generally user interfaces) exist. One example is a menu driven user interface in which a series or hierarchy of menus is shown in a series of screen views. A main menu is displayed to the user in an initial screen view. Based on the user selection made from the main menu, a succeeding screen view displays a submenu associated with the main menu selection, and so forth.

Another example of a common content display scheme is the use of so-called "soft keys". A soft key label is displayed in a screen view (typically in one of the lower corners of the display area) and correspond to a multi-purpose key (e.g., actuator or controller) in the keypad or similar controller/actuator area of the electronic device. Based on the state or mode of operation of the electronic device, the current function of the corresponding key is indicated by the displayed soft key label. For different states or modes of operation of the electronic device, the mechanical multi-purpose key has different functions and different respective corresponding soft key labels are displayed. Typical soft keys include "exit", "delete", "next", "more", "back", etc.

Other display schemes and user interfaces exist, some involve audio signals as well as visual signals. Examples of user interfaces and soft key features include:

U.S. Pat. Nos. 6,421,545, and 6,567,133,

U.S. Patent Application Nos. 2002/0158915, 2003/0008686, 2003/0071792, 2003/0174073, 2003/0231163, and 2003/0231208, Korean Patent Application No. 20020955227, and "Winterm 2930 and the Latest Dynamic Duo" by Dave Molta in Network Computing, http://www.networkcomputing.com/814/814 sp2.html.

SUMMARY OF THE INVENTION

Applicants have discovered that the further away the screen view display of a soft key label is from the corresponding mechanical key, the less intuitive and the less user friendly the user interface is. In order to maintain or enhance the association between a soft key label (displayed in the screen view) and the corresponding mechanical key (actuator or controller), applicants provide the present invention. The present invention introduces:

1. Visual cues such as a moving arrow directing the user's attention from the soft key label in the lower corner of the screen display toward the mechanical key in the keypad area that corresponds to the "soft key";
2. A "bubble" containing help text automatically being made to appear in (fading in/out of) screen views as the system infers is warranted/needed;
3. A sliding in/out presentation of menus in a series of screen views (i.e., the sliding presentation being in series order); and
4. Automated enlarging of pertinent text during user interactivity, i.e., as a function of operations/selections made by the user. This feature also includes the dimming or "ghosting back" of non-pertinent screen contents given the mode of operation or state of action by the end user.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 3:
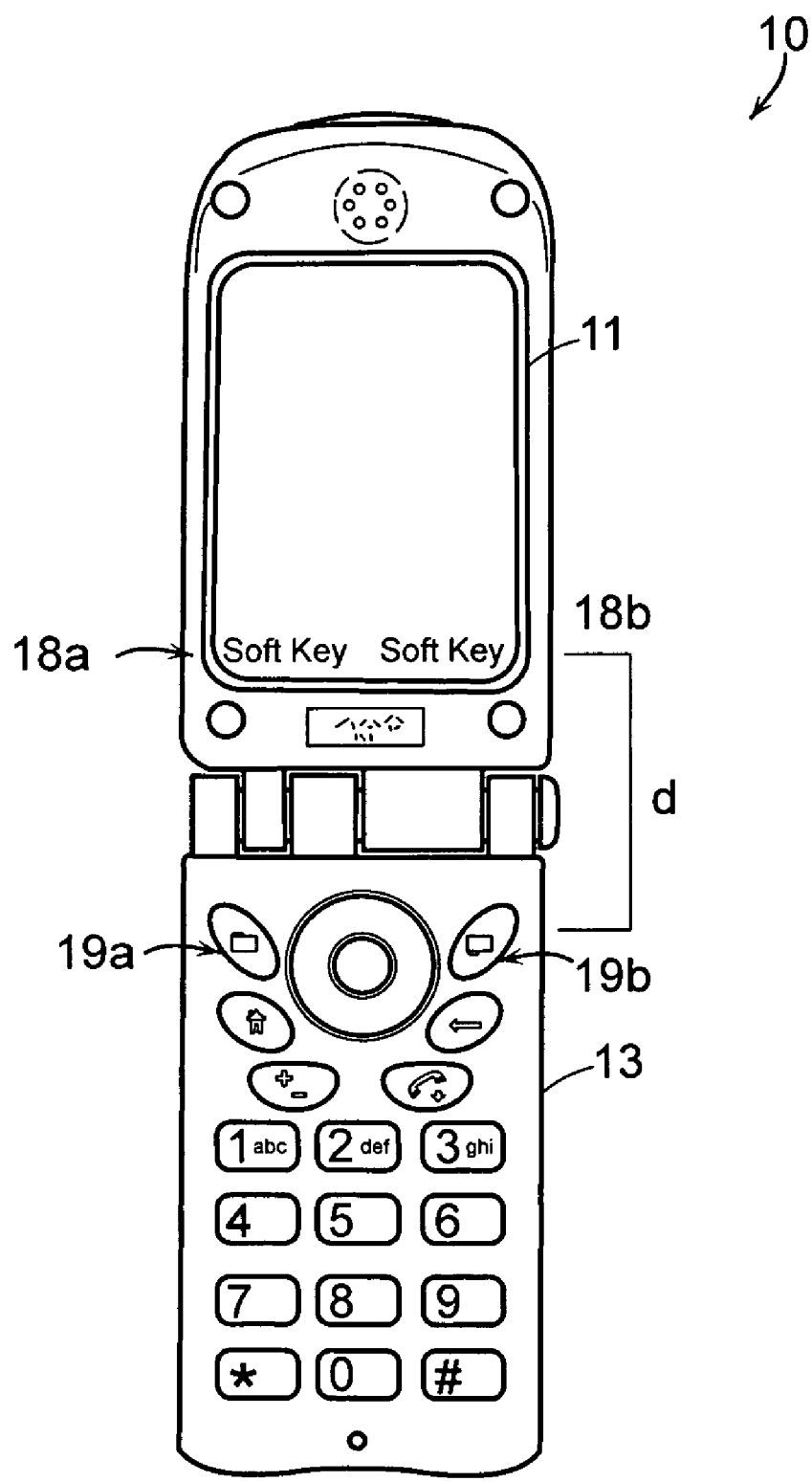
FIG. 3 is a schematic illustration of a handheld device with soft keys to which embodiments of the present invention are directed.

Although soft keys have become a standard feature in user interfaces of hand held devices, such as mobile phones, they can often be overlooked by the user. For example, a first-time user or a user unfamiliar with the device may not notice the appearance of a soft key label on a displayed screen view. Or if noticed the user may not know that the soft key labels are a means for making progress and completing a task. This issue is especially common when the actual physical gap (distance) between the soft key label on the display screen and the corresponding mechanical key on the handset is large. FIG. 3 is illustrative.

As shown in FIG. 3 a handheld electronic device 10 has a display screen portion 11 and a keypad or handset portion 13. Soft key labels 18 are often displayed in the lower corners of the display screen portion 11. The corresponding mechanical key (actuator or controller) 19 is separated from the displayed soft key labels 18 by a distance 'd'. Typically this distance 'd' poses a great enough gap that it is challenging for new users to associate the soft keys 18 (i.e., the soft key labels 18 displayed on the display screen 11) with the corresponding physical keys 19 (actuator/controller) on the handset 13.

To overcome this issue, applicants have designed means for soft keys 18 to be noticed by users (and in particular new users) when the soft key labels are first displayed in a screen view 11, as well as at other times. The invention system controls the behavior of the soft key's appearance, and varies the behavior based on dimensions such as time duration or whether or not a user is trying the application for the first time. Making the soft keys 18 alter their behavior (appearance) when they first appear on the display screen 11 can help the user notice their presence by using dynamic behavior (such as animation or transparent overlay), sound (audio) or other graphical, video, multimedia, etc. means for explicitly showing the user where to look for the corresponding mechanical key 19 (actuator/controller). This can help lead to faster user learning times and increases encouragement for consumers to become more confident in trying to use new (and perhaps more complex) data services and applications through handheld electronic devices 10.

Figure 4:
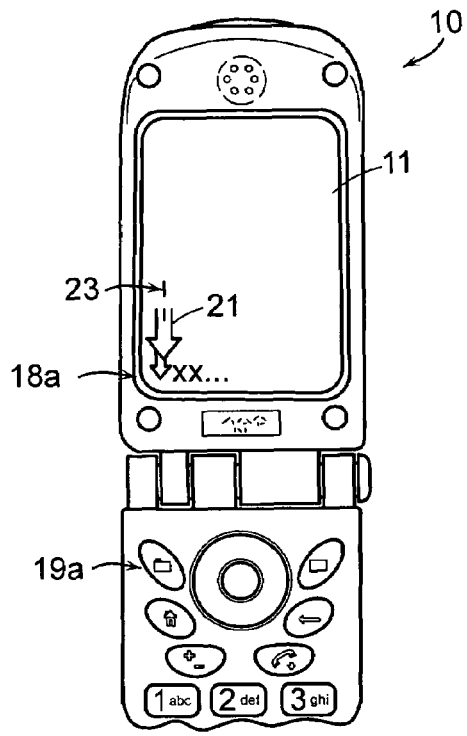
FIG. 4 is a schematic illustration of a visual cue display enhancement of the present invention.

In one embodiment the present invention provides visual queues, such as a moving arrow directing the user's attention from the soft key label 18a displayed in a lower corner of the screen display 11 toward the mechanical key 19a in the keypad area 13 that corresponds to that soft key 18. FIG. 4 is illustrative.

As shown in FIG. 4, the soft key label "xxx . . . " 18a is rendered in the lower left corner of the display screen area 11. Overlayed on that soft key label 18a is a video graphic arrow 21 oriented to point downward toward the corresponding actuator key 19a. Down arrow 21 is displayed as moving from an initial starting position 23, through intermediate positions, to the lower border/edge of screen display area 11. In other embodiments, color changes (schemes) and/or audio signals corresponding to the downward movement of the displayed arrow 21 or other visual effects to highlight arrow 21 in its indication of actuator key 19a may be employed.

Figure 5:
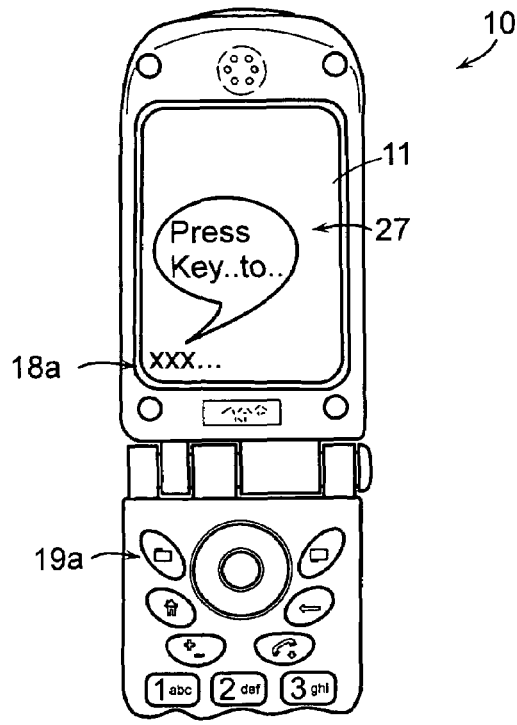
FIG. 5 is a schematic illustration of a help text enhancement to displayed soft keys of the present invention.

In another embodiment, the present invention provides simultaneous display of a corresponding help "bubble" (or generally, informational text) and the soft key label 18a. This enhancement provides guidance (assistance), in narrative form, in interpreting and hence using the currently displayed soft key 18. FIG. 5 is illustrative.

In FIG. 5, when the display screen area 11 presents subject soft key label 18a, the system also displays so called help text 27 corresponding to the subject soft key 18. In a preferred embodiment, the help text 27 is displayed in a graphical bubble or similar symbol that implies that the help text is related or correlates to the soft key 18 and soft key label 18a. The text contents provide use instruction, elaborated information or clarifying comment and the like on corresponding soft key 18 and its actuator mate 19a. Again, color schemes, audio signals, video graphics and/or flashing of the bubble symbol and help text 27, in whole or part, or other visual effects to highlight help text 27 and its implication of actuator key 19a may be employed.

In another embodiment, the system displays the help text 27 fading in and fading out of screen views as is pertinent. For example, for the first n times that the system displays subject soft key label 18a, the system simultaneously renders a constant display of help text bubble 27 (as long as soft key label 18a is displayed). In subsequent (n+1) and later displays of the soft key label 18a, i.e., after there is a history of the user properly using the soft key 18 function, the system renders a shortened timed display (as opposed to continuous with display of soft key label 18a) of the help text 27.

The system preferably uses a fading in/fading out manner of display and may increase the delay period from the instant the soft key label 18a is rendered in the screen view to the beginning of the fading in of the corresponding help text 27. In instances where the user activates the corresponding actuator key 19a before the end of the delay period (or some other predefined time threshold), no display of the help text 27 is made. The system may track the number of times in which no display of the help text 27 is made inferring that the user has learned how to use the subject soft key 18 and no longer needs the invention enhancement (help text 27).

Figure 6A:
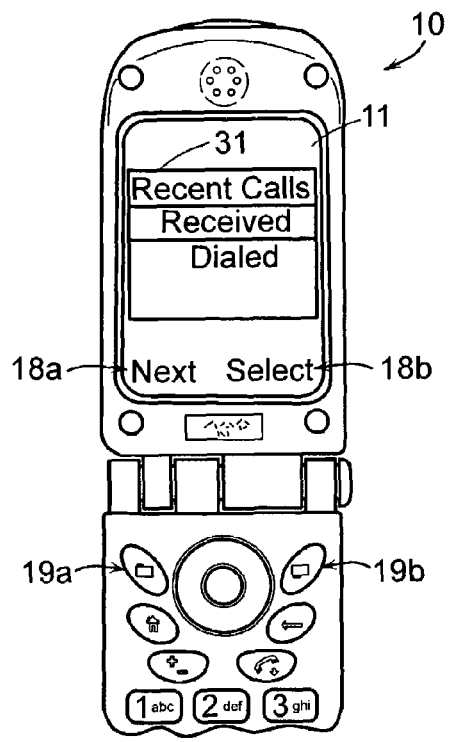
FIGS. 6a-6d are schematic illustrations of a sliding presentation of menus that enhances a series of menu screen views according to the present invention.
Figure 6B:
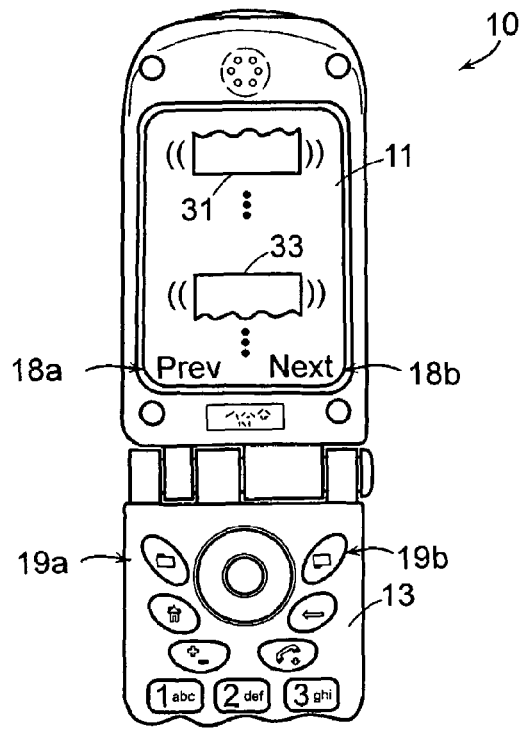
Figure 6C:
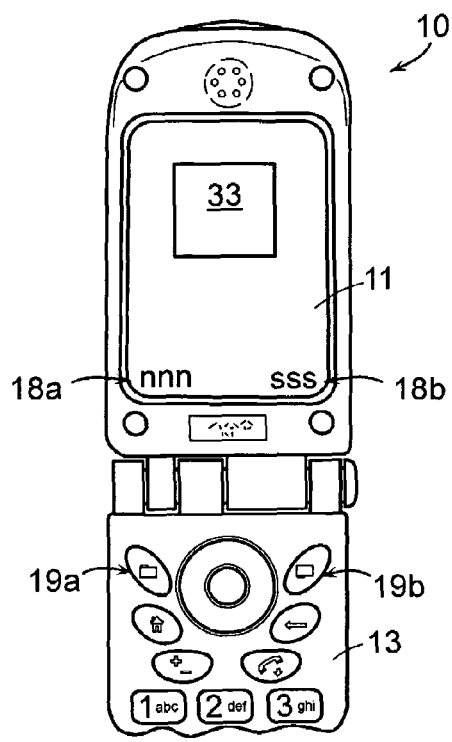
Figure 6D:
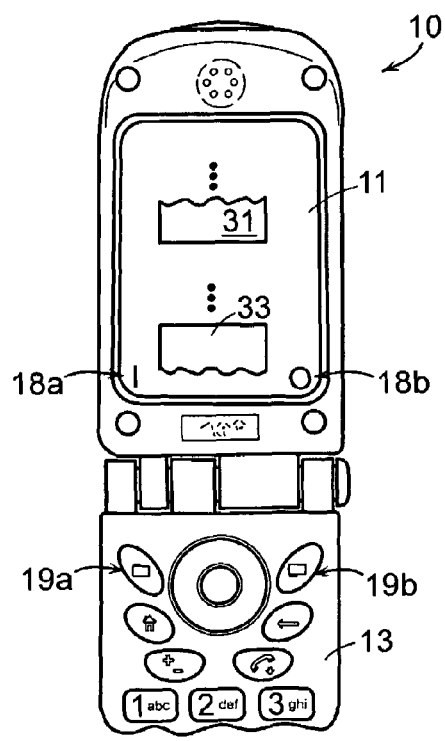

In another embodiment of the present invention, display of a series or hierarchy of menus in a series of screen views is enhanced. With reference to FIGS. 6a-6d, an initial or first menu 31 is displayed in display screen area 11. Upon user selection (through soft keys 18, 19 or other keys) of one of the displayed menu's options, the first menu 31 is shown (FIGS. 6a to 6b) sliding in one direction (e.g., upward) out of view, and the succeeding menu 33 is shown sliding in the same direction (upward from a lower starting point) into view. Subsequently, upon the user operating a proper key in the keypad area 13 to return to the previous menu 31, the system displays the succeeding menu 33 currently displayed sliding in the opposite direction (downward) out of view and the first menu 31 sliding that same direction (downward) into view (FIGS. 6c and 6d).

Similarly from one screen view to the next displaying of one menu to the next in a hierarchy of menus, the system displays each menu as sliding in/out of view in succession with the preceding/succeeding menu. It is understood that the example directions of upward and downward could be leftward and rightward respectively.

This sliding presentation of menus in series order provides a sense of direction of traversal through the hierarchy. The menus displayed sliding in one direction signifies one direction of traversal in the hierarchy (e.g., drilling down), and display of menus sliding in an opposite direction signifies the opposite direction of traversal in the hierarchy (e.g., drilling back up).

Such sense of direction of traversal in the hierarchy of menus is needed in electronic devices with limited display screen sizes/areas that make display of cascading menus (or similar views of the hierarchy of menus) difficult if not impossible to achieve. The sliding in/out presentation of menus of the present invention is an effective and space-efficient substitute for the cascading or similar display of menu series in the prior art.

Further such sliding presentation enables a directional meaning to be associated with soft keys 18 and corresponding actuators 19. That is, the series of menus sliding in one direction is affected by one corresponding actuator 19a, and the series of menus sliding in an opposite direction is affected by another actuator 19b. Preferably actuator 19a is positioned to one side of the screen area 11 or keypad area 13, and actuator 19b is positioned on the opposite side thereof. This further emphasizes the direction of menu movement associated with actuators 19a and 19b. For example, actuator 19a is positioned on the left side of keypad area 13 and affects leftward movement of sliding presentation of menus. Likewise on the opposite side of keypad 13, actuator 19b lies and affects opposite direction (rightward) sliding presentation of menus in screen view area 11.

Once shown to a user, it is fairly easy for the user to make the association between the left actuator 19a/right actuator 19b and the left/right (or up/down) directional movement of sliding menus in series or hierarchy order. In turn, this same association is made between actuators 19a, 19b and the traversal direction in the hierarchy of the menus (drilling up/down). As such the present invention enhances navigation through a series or hierarchy of menus.

Figure 7:
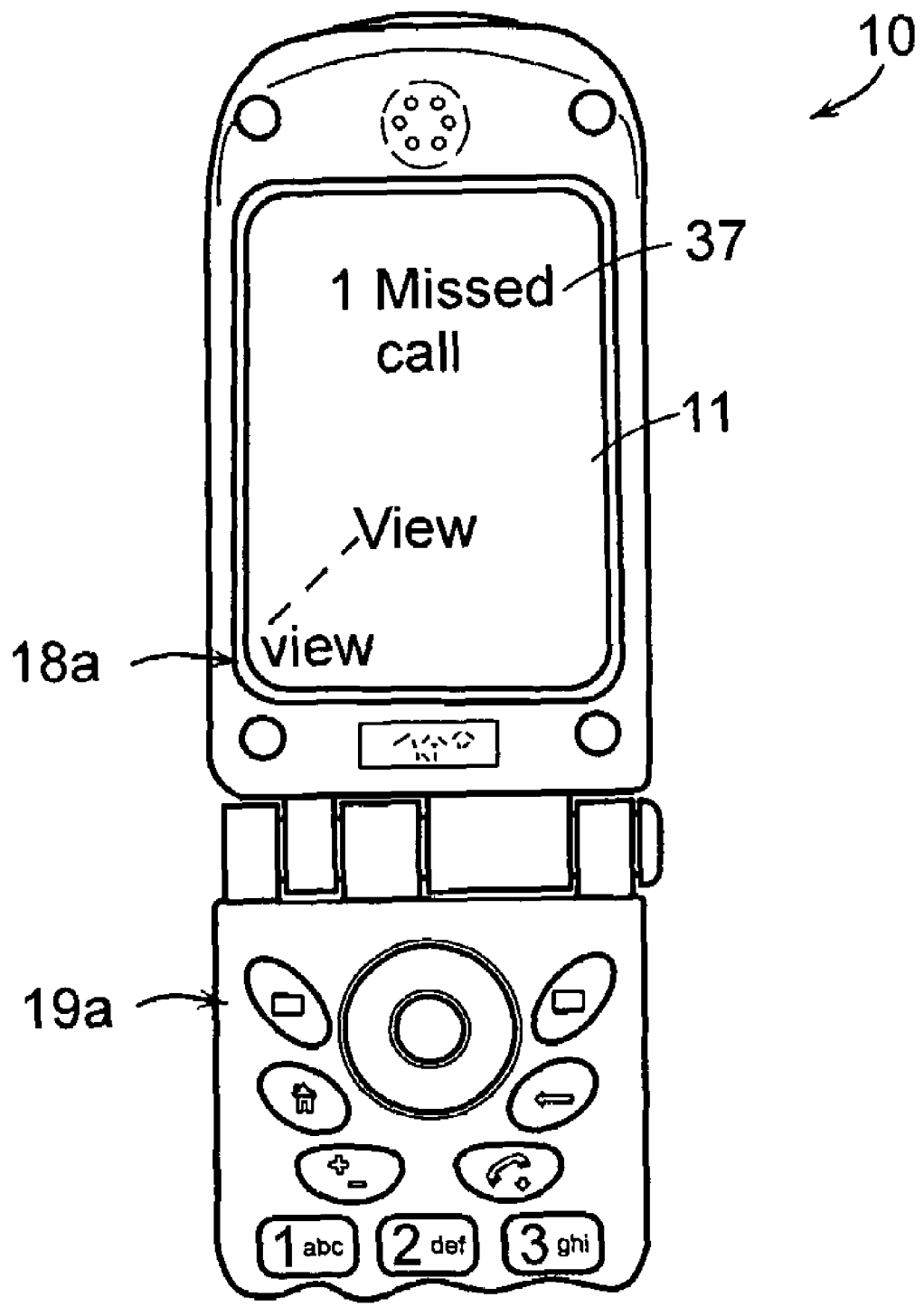
FIG. 7 is a schematic illustration of an automatically enlarged text enhancement in screen displays of the present invention.

Turning now to FIG. 7, another embodiment of the present invention is illustrated. During user interactivity with device 10, as a function of operations/selections made by the user, the invention system relatively enlarges pertinent displayed text 37 in the display screen area 11. In turn, the user's attention and focus is more appropriately placed (i.e., on the pertinent displayed text 37) and the user experience with device 10 is enhanced overall.

The relative enlarging of pertinent text may be in combination with a diminishing of size, luminance or clarity of non-pertinent screen contents. To accomplish this, the invention system applies a scaling down of size or dimming of or so called ghosting back of non-pertinent screen contents.

In FIG. 7, the first pertinent text 37 is the term "missed" which the system has displayed in larger font size than neighboring word "call". The later is displayed in typical or normal font size. Also illustrated in FIG. 7 is the enlarged soft key label 18a. The "normal" font size of this soft key label 18a is also shown in FIG. 7 for purposes of comparison. With the terms "missed" and "view" enlarged in the screen view, the user's attention is directed to the function of viewing missed calls. In turn, the user is more effectively prompted to operate soft key 18/corresponding control key 19 toward that purpose/function (i.e., viewing missed calls).

Accordingly, the present invention's relative enlarging of pertinent text 37 in display screen area 11 and dimming or "ghosting-back" of other screen contents effectively highlights the mode of operation and available functions to the user. Again, such enhancement of screen displays is a needed improvement in handheld electronic devices 10 which have limited display area 11 and cannot employ user interfaces and display schemes of larger (desktop size) monitors/display systems.

The foregoing enhancements of the present invention provide actively induced training of the user and actively induced user operation of soft keys 18 (and corresponding actuators 19) in devices 10. The following describes techniques used to implement the same in one embodiment.

Figure 1:
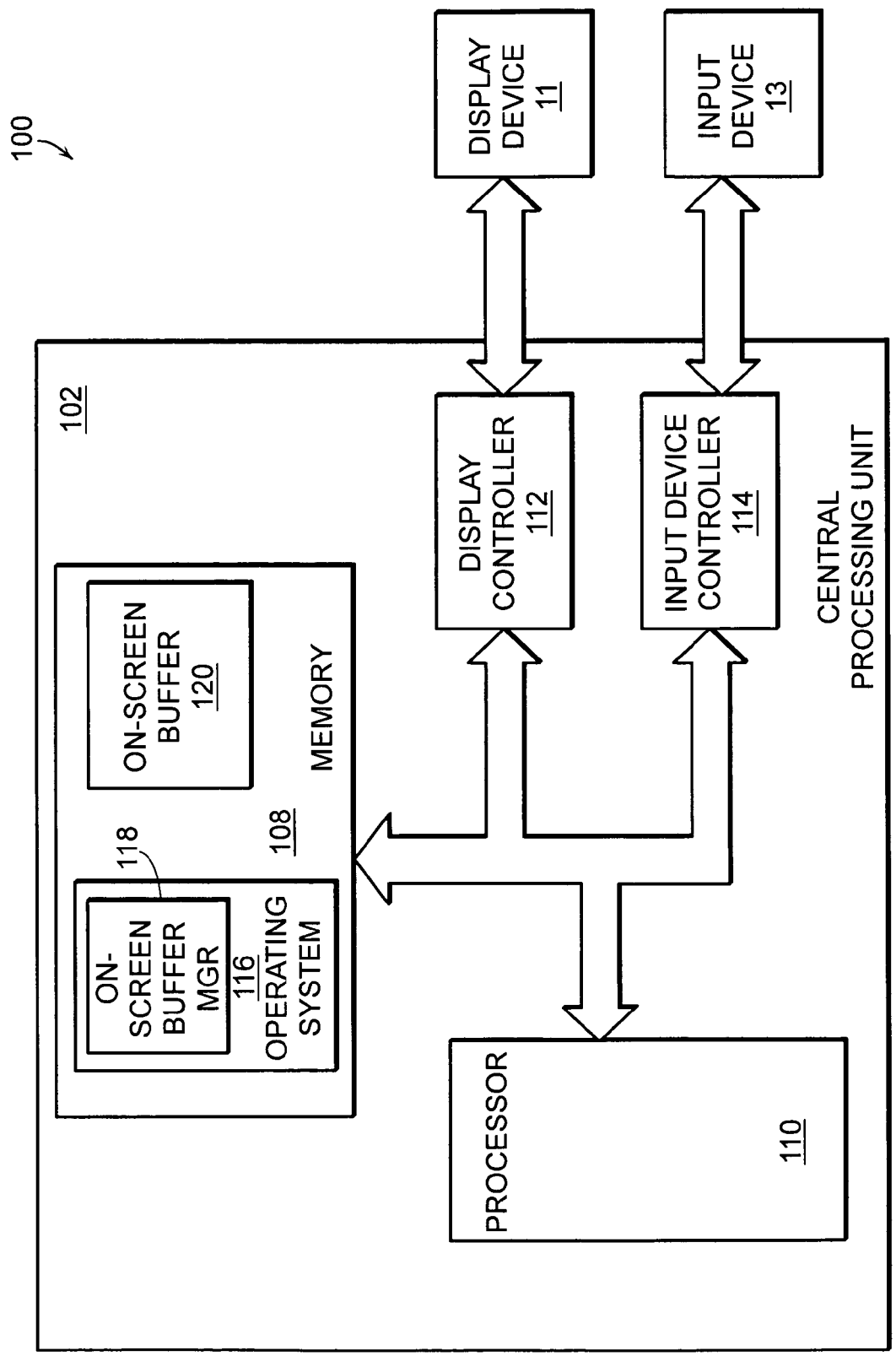
FIG. 1 is a block diagram of a computer system including an on-screen buffer managed by an on-screen buffer manager according to the principles of the present invention.

FIG. 1 is a block diagram of a computer or digital processing system 100 employed by the handheld electronic devices 10 of the present invention. The computer system 100 includes an on-screen buffer 120 managed by an on-screen buffer manager 118 according to the principles of the present invention. The computer system 100 further includes a central processing unit 102 coupled to the display screen portion 11 of the handheld electronic device 10 and the keypad or input portion 13 of the device 10. The display screen portion 11 is formed of a screen for displaying a two-dimensional array of pixels representing the contents of the on-screen buffer 120. The screen can be a flat panel screen, a Liquid Crystal Display (LCD) or any other type of screen typically used by electronic devices.

A portion of the memory 108 is reserved for the on-screen buffer 120. The on-screen buffer manager 118 in an operating system 116 in the memory 108 manages updates to the on-screen buffer 120. In the embodiment shown, a portion of the memory 108 is reserved for the on-screen buffer 108. However, in alternate embodiments, the on-screen buffer 120 can be a separate memory.

A processor 110 is coupled to the memory 108, a display controller 112 and an input device controller 114. The display controller 112 coupled to the display screen portion 11 reads the on-screen buffer 120 for display by the display screen 11. The processor 110 is also coupled to an input device controller 114 for processing keycodes received from the keypad portion 13 coupled to the input device controller 114. In addition to the keypad 13, input device controller 114 may be responsive to a keyboard, mouse or any other type of input device typically used in a computer system 100 (electronic device 10).

Figure 2:
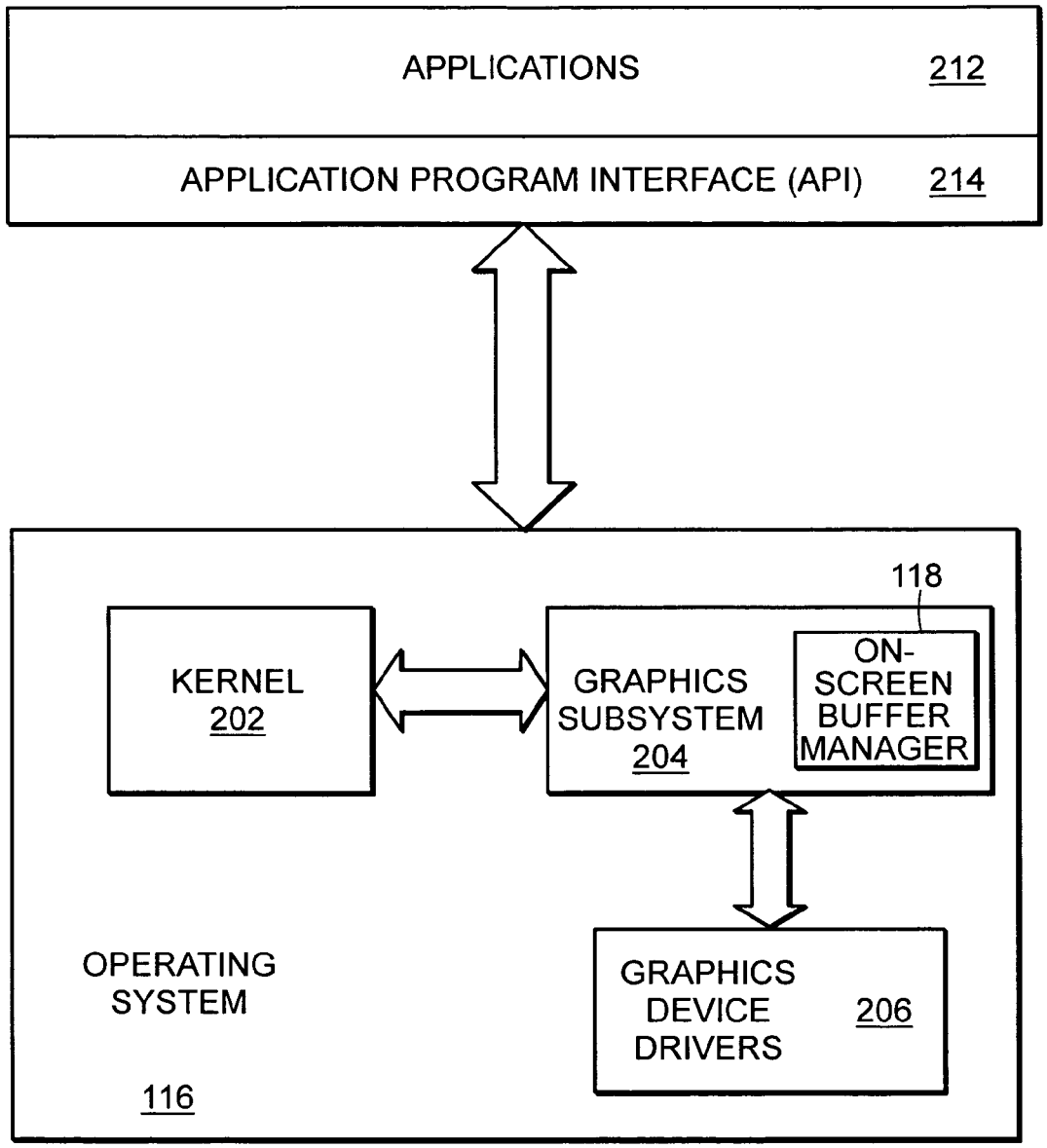
FIG. 2 is a block diagram of an operating system including the on-screen buffer manager in the computer system shown in FIG. 1.

FIG. 2 is a block diagram of the operating system 116 including the on-screen buffer manager 118 shown in FIG. 1. The operating system 116 also includes a kernel 202, graphics subsystem 204 and graphics device drivers 206. An application 212 calls the operating system 116 through an Applications Program Interface (API) 214. The application program can be an object oriented application, for example, a JAVA application.

The type of display device 11 coupled to the computer system 100 may be hidden from the application 212 by the operating system 116. In that case, each graphics device driver 206 includes functions to support a particular type of display device 11.

The graphics subsystem 204 includes the on-screen buffer manager 118 for managing the on-screen buffer 120 in memory 108. The on-screen buffer 120 corresponds to the two dimensional co-ordinate system of the display screen 11 and is continuously read by the display controller 112 for display on the display screen portion 11 of the handheld electronic device 10. The above-described invention enhancements to the data (soft key labels 18) displayed on the screen display 11 are provided to the on-screen buffer 120 while the on-screen buffer 120 is read for display on the screen portion 11. The on-screen buffer manager 118 provides the invention enhancements to the on-screen buffer 120 by (i) inserting the visual cues, (ii) inserting the "bubble" containing help text, (iii) applying a sliding in/out presentation of menus and/or (iv) enlarging pertinent text as a function of user operations/selections and history of user inter-activity according to processor 110 logic.

For example, an initial display command to display a given soft key label 18a, b is issued to the operating system 116 through the API 214. In response, the operating system 116 directs the display command to the graphics subsystem 204. Based on user selections, current operation status and user inter-activity history, processor 110 logic further effects operating system 116 to enable on-screen buffer manager 118/ graphics subsystem 204 to apply the invention enhancements. In particular, operating system 116 indicates to on-screen buffer manager 118 that this is an initial display of the given soft key label 18a, b. In response, on screen buffer manager 118 inserts the given soft key label overlayed by a moving (videographic) arrow 21 (in FIG. 4 embodiment) in the on screen buffer 120. If a threshold period of time passes and the processor 110 does not receive keypad input from the user, then processor 110 updates the operation status of the subject device 10. In turn, operating system 116 indicates to on screen buffer manager 118 the need for display of help text 27. On screen buffer manager 118 inserts the "bubble" or similar symbol containing pertinent help text 27 into the on screen buffer 120 for display of the FIG. 5 enhancement on the device display screen 13. Similarly, according to mode of operation or state of user interaction/inaction, processor 110/ operating system 116 direct on-screen buffer manger 118 to apply various enhancements (FIGS. 4-7) of the present invention, separately or in combination, to the on screen buffer 120 as described above. In turn, the soft keys 18 and invention enhancements are rendered in display screen portion 13 from on screen buffer 120.

It is understood that processor 110 logic may employ various state machines, counters, and other techniques known in the art given the FIGS. 4-7 description of the present invention enhancements.

Accordingly, the present invention provides a next generation of soft keys using a variety of visual cues (some with a motion aspect). In particular, the present invention employs video graphics (e.g., icons in motion), a pattern of movement between screen views, and/or visual (optionally audio-visual) techniques for drawing a user's attention to certain pertinent text (e.g., automatic text highlighting by font resizing or shading, help-like bubbles that appear and reappear as the system detects is needed, etc.). As such the present invention provides visual cues that actively induce operation of soft keys. Such active inducement in the presentation of soft keys is not found in the prior art.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electronic device comprising:
   a keypad portion having at least one multifunction key; and
   a display area configured to display a screen view comprising:
      at least one soft key label corresponding to the at least one multifunction key, and
      at least one visual cue presented along with the at least one soft key label, wherein the at least one visual cue is configured to visually associate the at least one multifunction key with the at least one soft key label, wherein the at least visual cue one is animated, wherein the at least one visual cue comprises a videographic arrow, wherein the videographic arrow is presented in animated movement from the at least one soft key label towards the corresponding at least one multifunction key.

2. An electronic device, comprising:
   (i) a keypad portion having at least one multiple function key,
   (ii) a display area configured to display a screen view,
   (iii) a processor, and
   (iv) a memory comprising an on-screen buffer manager, wherein the on-screen buffer manager is configured to, when executed by the processor, implement a method for presenting the screen view in the display area, the method comprising:
      displaying at least one soft key label in the display area, wherein the at least one soft key label corresponds to the at least one multifunction key; and
      displaying at least one visual cue in the display area, wherein the at least one visual cue is presented along with the at least one soft key label, wherein the at least one visual cue is configured to visually associate the at least one multifunction key with the at least one soft key label, wherein the at least one visual cue is animated, wherein the at least one visual cue comprises a videographic arrow, wherein the videographic arrow is presented in animated movement from the at least one soft key label towards the corresponding at least one multifunction key.

* * * * *

UNITED STATES PATENT AND TRADEMARK OFFICE
CERTIFICATE OF CORRECTION

PATENT NO.       : 7,619,615 B1                               Page 1 of 1
APPLICATION NO.  : 11/216420
DATED            : November 17, 2009
INVENTOR(S)      : Karen Donoghue It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Twenty-sixth Day of October, 2010

David J. Kappos
*Director of the United States Patent and Trademark Office*